July 28, 1959 MASAMICHI KAKUNODATE 2,896,500
MAGNIFICATION POWER CHANGING MECHANISM FOR VIEW-AND-RANGE-FINDER
HAVING ROTATABLE GALILEAN TYPE OPTICAL SYSTEM
Filed Jan. 3, 1957 2 Sheets-Sheet 1
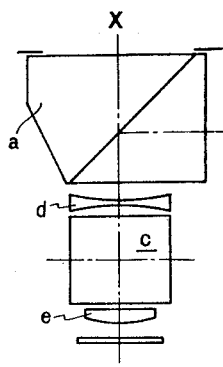
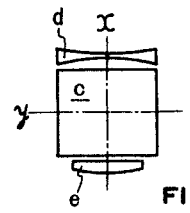
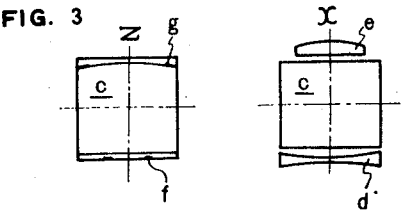
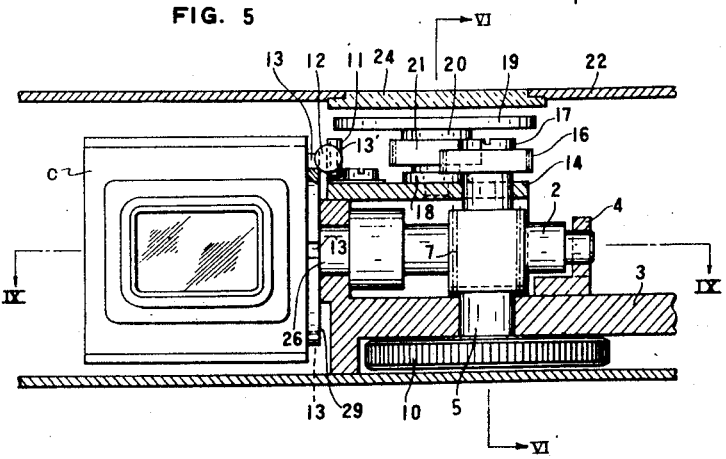
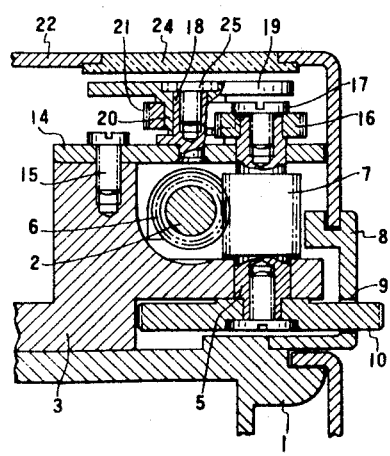
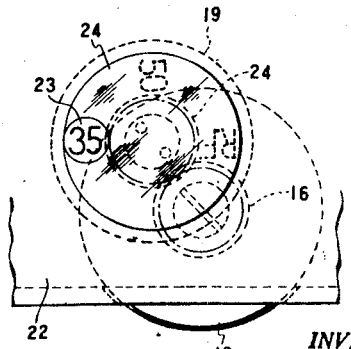
INVENTOR.
MASAMICHI KAKUNODATE
BY
ATTORNEY

INVENTOR.
MASAMICHI KAKUNODATE
BY
ATTORNEY

United States Patent Office 2,896,500
Patented July 28, 1959

2,896,500

MAGNIFICATION POWER CHANGING MECHANISM FOR VIEW-AND-RANGE-FINDER HAVING ROTATABLE GALILEAN TYPE OPTICAL SYSTEM

Masamichi Kakunodate, Tokyo, Japan, assignor to Canon Camera Company, Inc., Tokyo, Japan, a corporation of Japan Application January 3, 1957, Serial No. 632,315

Claims priority, application Japan April 21, 1956

6 Claims. (Cl. 88—1.5)

The instant invention relates to an improvement in a mechanism for changing the magnification power of a view- and range-finder having a rotatable Galilean type optical system.

An object of the instant invention is to provide an effective, useful and simplified mechanism to change the magnifying power of the aforesaid variable power view- and range-finder.

Another object of the instant invention is to provide a horizontal shaft on which the turret mechanism of the variable power optical-system in the aforesaid range-finder rotates, whereby but very few members project from the camera housing.

Another object is to improve the appearance of the camera as also to ensure better manipulation of the camera.

By the magnifying power changing mechanism of the instant invention, a simple structure is obtained for the desired purpose by providing but few members occupying no appreciable space in the camera body. By so doing a nice appearance is imparted to the camera, since the indicator dial of the view-finder is inside the range-finder cover and the indicator reading window is formed at the top of the camera casing. In comparison with conventional mechanisms having the indicator dial on the top surface of the camera casing, the device according to the instant invention is quite unrestricted as to the size of the characters to indicate the magnification of the viewfinder in the particular setting and provides a sufficiently large dial carrying reasonably large characters which can easily be distinguished. Characters showing the focal lengths of interchangeable lens may be marked directly on the indicator.

A prior known variable magnification viewfinder employs a vertical rotatable shaft to support the optical system, but my research has demonstrated that a horizontal rotatable shaft is more convenient for this purpose. By such arrangement of the shaft, additional valuable space is obtained around the optical system for positioning therein other small mechanisms required in the camera, or such space provides more room for the optical system itself to enable a more preferable arrangement thereof.

The novel characteristics I consider characteristic of the instant invention are set forth with particularity in the appended claims. The invention itself, both as to its organization and mode of operation, together with additional objects, features and advantages thereof, will best be understood from the following description when read in conjunction with the accompanying drawings, in which:

Fig. 1 is a plan view of the optical system of a preferred view- and range-finder according to the instant invention;

Figs. 2, 3 and 4 are plan views of the rotatable variable power optical system in its respective positions;

Fig. 5 is a sectional view of the device along line V—V of Figure 8;

Fig. 6 is a sectional side view along the line VI—VI of Fig. 5;

Fig. 7 is a plan view of the indicator reading window;

Referring to Fig. 1, the rangefinder of the so-called image coincidence type comprises a prism $a$ having a semi-transparent mirror and a movable prism $b$. A rotatable, variable power optical system C is inserted at the rear of semi-transparent prism $a$. The rotatable, variable power optical system comprises a Galilean optical system consisting of a concave lens $d$ and a convex lens $e$ aligned on the same optical axis $x$ and located at each side of the cubic block $c$ respectively. As shown in Figures 2 and 4, a negative lens provided with a rectangular reflecting mirror $g$ at its marginal portion, and a flat glass provided with a frame mark $f$ on its central portion, are cemented respectively to the upper and lower faces of block $c$. A virtual image of frame mark $f$ is formed by reflecting mirror $g$ when viewed along another optical axis $y$ from the bottom to the top in Figure 3. Such variable power optical system is aligned with the optical axis $x$ of the view- and range-finder. The mode of operation is as follows: When the axis $z$, perpendicular to the axes $x$ and $y$ of the optical block $c$, is aligned with the semi-transparent prism $a$, a unit magnification (or life size) image is produced corresponding to the standard focal length objective used with the camera, of which the image field is framed by the reflected light frame; when the optical system is positioned as shown in Figure 2, a wider field results corresponding to a wide angle objective; and when the optical system is rotated 180 degrees about axis $y$, that is from the position shown in Figure 2 to that of Figure 4, the magnification is changed to correspond to a telephoto objective, and, in its special case, as shown in this embodiment, this high magnification power may be utilized for range finding purposes. Such optical system is quite common and well known to those skilled in the art. Thus the desired magnifying power for the image field corresponding to an interchangeable lens can be obtained; for instance, image fields corresponding to 35 mm. and 50 mm. focal length lenses and high power for range finding.

Now the turret mechanism of rotatable, variable power according to this invention will be set forth in detail.

Figure 8:
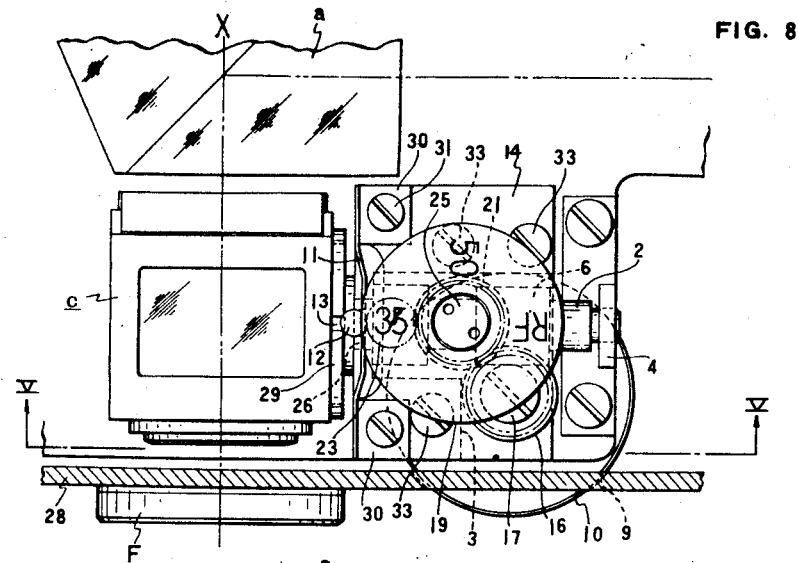
Fig. 8 is a plan view of the device according to the instant invention with its top cover removed.

Referring to Figure 1, the negative lens $d$ is a rectangle corresponding to the shape of the picture to be photographed. If the optical system is rotated about a vertical axis, the rotation is obstructed by the end of large lens $d$ and semi-transparent prism $a$. Such objection will be eliminated by rotating the optical system about a horizontal axis, axis $y$ of Figure 2, since the upper and lower edges of the large lens $d$ do not touch prism $a$. On the other hand, if a lens of the same size as lens $d$ is employed in the horizontally rotating mechanism, lens $d$ may be located further outwardly from its center of rotation than in the vertically rotating device. This applies also to the other lens $e$, and consequently, these two lenses comprising a Galilean telescope, may be adequately spaced from each other. Such increased and adequate spacing between the two lenses allows the use of a larger radius of curvature in each lens element, when identical optical performance is desired, as compared to an optical system with less spacing between the lenses. Needless to say, the larger radii of curvature of the optical elements decrease the aberrations more than do smaller radii of curvature. The space about the optical system won by the use of horizontally rotating mechanisms may be further utilized for other small mechanisms; for example, a parallax correcting mechanism may be inserted between the eyepiece F and the optical system in Figure 8, but such mechanism is not here described as it is no part of the invention of the present application. The horizontal shaft 2 is rotatably mounted to a base frame 3 in a bearing 4. The horizontal shaft 2 is disposed in engagement with a vertical shaft 5 rotatably mounted in base frame 3 by screw gears 6 and 7, meshing with each other and affixed to shafts 2 and 5 respectively. By a protruding part of an operating disk or knurled ring 10 rigidly secured to vertical shafts 5 from the back of the camera body through an opening 9 provided in the rear portion of rangefinder chamber 8, the variable power optical system is rotated around said horizontal shaft 2. A click stop mechanism consisting of a spring plate 11, a steel ball 12, an opening 13' in spring 11 to receive the ball, and grooves 13 on the rotatable member 29 affixed to one end of the optical system, is provided to assure proper positioning of the optical system as shown in Figure 8. A gear 16 is adjustably attached by means of a screw 17 on the top of vertical shaft 5 supported by bearing plate 14 which is affixed to base frame 3 by screw 15. An indicator dial 19 is integral with a sleeve 20 and a gear 21 and rotatably supported on a stub shaft 18 on bearing plate 14 by means of screw 25, gear 21 meshing with gear 16. On the upper surface of indicator dial 19, characters, for example 35, 50 and RF to show the respective focal lengths of the objective lenses or the magnifying power of the viewfinder, are carved thereon to indicate the magnifying power of the variable power optical system C. A window or aperture 23 is provided in the camera casing 22 in alignment with the characters on indicator dial 19. Aperture 23 is of such size as just to render visible only one of the indicating characters at a time, and may alternatively be designed with a relatively large transparent disk 24, such as a glass or the like, affixed onto the camera casing 22 with window or aperture 23 thereof transparent to read the character, with the remaining part thereof being opaque or semi-transparent. The relative position of the rotating optical system and the indicator dial in respect of window 23 may be adjusted by means of adjustable gear 16 on vertical shaft 5 by screw 17, or, in the alternative, the adjustment may be made by means of gear 21.

Figure 9:
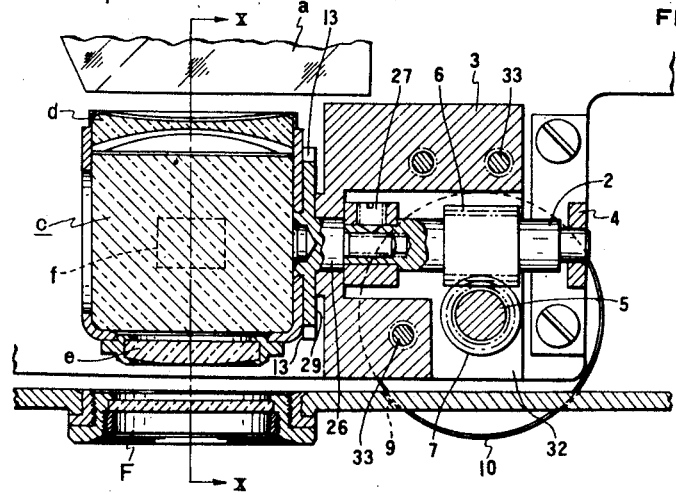
Fig. 9 is a sectional plan view along line IX—IX of Fig. 5.
Figure 10:
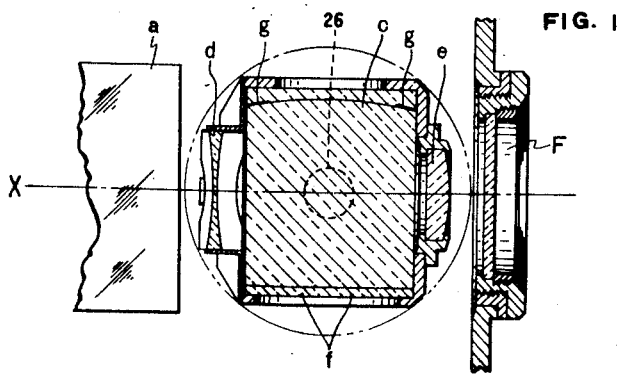
Fig. 10 is a sectional side view along line X—X of Fig. 9.

Referring to Figs. 8 and 9, a horizontal shaft 26 is coaxial with a horizontal shaft 2 forming an extension thereof. The horizontal shaft 26 is integral with disk 29 carrying the peripheral detent 13 for the click stop. The two shafts are adjustably connected by means of a connecting screw 27 and journaled in base frame 3 and bearing 4. Vertical shaft 5 is journaled in base frame 3 and bearing plate 14. Horizontal shaft 2 is coupled with vertical shaft 5 by screw gears 6 and 7 secured to the respective shafts. An operating disk or knurled ring 10 is rigidly secured to vertical shaft 5 and has a peripheral portion projecting outside the back casing of the camera through opening 9 provided at the rear of rangefinder chamber 8. The variable optical system c is attached to rotatable member 29. Plate spring 11 is affixed to base frame 3 by means of bent supports 3 and screws 31 to face rotatable member 29, the spring plate 11 having an opening or a groove to receive small steel ball 12 between it and rotating member 29. Steel ball 12 is arranged on engagement with opening 13 to function as a click stop mechanism.

The operation of the device is as follows: Viewing; through the finder eye piece F, the user rotates knurled disk 10 with the thumb of his left hand to select the power of the rotatable optical system C, lightly feeling the opposition of the click stop mechanism. Since the photographer can operate the device without moving the rest of his hand or his other fingers while holding the camera in his hand to photograph a subject, adjustment of the magnifying power can readily be done at ease at the user's original posture; the mechanism according to the instant invention thus provides snapshot performance and satisfies the aforesaid objects. Furthermore it will be noted that the turret mechanism with a horizontal shaft results in a remarkably simple and sturdy structure by arranging horizontal shaft 2, vertical shaft 5 and screw gears 6 and 7 thereon in the cut off portion 32 (see Fig. 9) of base frame 3 described above.

The photographer, viewing the subject through eyepiece F, turns knurled disk 10 clockwise until he hears a click if he wants highly accurately to measure the distance he may now do so since the range finder is at its high magnification RF-mark. Then, when he turns the knurled disk in the opposite direction until he hears another click, indicating the positioning of the middle power of 50 mm. objective, he obtains the correct view for a 50 mm. photographic objective. While the RF-mark is provided for the special requirement of most accurate measuring, the view and range finder work excellently also at the 50-mark and at the 35-mark positions for, respectively, 50 mm. and 35 mm. photographic objectives.

While there has been described what is presently considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. A magnification power changing mechanism for view- and range-finders built into a camera housing, comprising a rotatable horizontal shaft, a support integral with the horizontal shaft, a plurality of Galilean telescopes on the support angularly to each other with the optical axis of each telescope passing through the center of rotation of the support, each telescope having a different and predetermined magnifying power, a rotatable vertical shaft, gearing interconnecting the horizontal and vertical shafts, a knurled disc integral with the vertical shaft, the camera casing defining an aperture through which a peripheral region of the knurled disk extends, an indicator dial connected to the top of the vertical shaft, an eyepiece with which the telescopes are alignable to view an object, and a plurality of indicia equal in number to the plurality of telescopes on one face of the dial for indicating the particular telescope of the plurality of aligned with the eyepiece.

2. A magnification power changing mechanism according to claim 1 in which a circular member about the horizontal shaft is attached to the support, the peripheral region of the circular member has at least two detents, a formed plate spring has both its ends attached to the camera body, and a metal ball is biased by the plate spring against the circular member to enter the detents on rotation of the support to a position in which a telescope is aligned with the eyepiece.

3. A magnification power changing mechanism according to cliam 1 having means for angularly adjusting the indicator dial relative to the vertical shaft.

4. A magnification power changing mechanism according to claim 1 in which the dial is supported on a stub shaft having a first gear, a second gear, and screw means affixing the second gear to the vertical shaft to mesh with the first gear whereby the second gear is angularly adjustable on the vertical shaft.

5. A magnification power changing mechanism according to claim 1 in which the rotatable horizontal shaft consists of two axially aligned and connected portions, one portion being affixed to the telescope support and being movable along its axis, and the other portion being connected by the gearing interconnecting it with the vertical shaft and being spatially fixed against movement along its axis.

6. A magnification power changing mechanism for combined view and range finders in a camera casing, comprising a rotatable first horizontal shaft spatially fixed against movement along its axis, a first gear integral with the first horizontal shaft, a second horizontal shaft aligned with the first horizontal shaft, threaded means interconnecting the first and second horizontal shafts with the second horizontal shaft axially distant from the first horizontal shaft a controllable distance, a disk integral with the outer end region of the second horizontal shaft, a plurality of detents in the peripheral region of the disk, a steel ball, a formed spring having its end affixed to the camera casing and its free intermediate region biasing the steel ball to enter a detent of the plurality, a carrier affixed to the disk, a plurality of Gallilean telescopes arranged on the carrier angularly to each other with the optical axis of each telescope passing through the horizontal axis on which the carrier rotates, each telescope having a different and predetermined magnifying power, an eyepiece with which the telescopes are individually alignable to view an object, the number in the plurality of detents being equal to the number in the plurality of telescopes and each detent being so positioned as to be aligned with, and partially entered by, the steel ball when the eyepiece is aligned with a telescope, a rotatable vertical shaft, a second gear integral with the vertical shaft and meshing with the first gear, a knurled disc integral with the vertical shaft, the camera casing defining an aperture through which a peripheral portion of the knurled disc extends, a vertical stub shaft adjacent the top region of the vertical shaft, a sleeve integral with a third gear rotatable on the stub shaft, an indicating dial detachably connected to the top of the sleeve, a plurality of markings on the upper face of the dial of a number equal to the number of the telescopes, a dial window in the camera casing of a size to expose but one marking at a time, and a fourth gear rotatable with, and angularly adjustable relative to, the vertical shaft so that the corresponding marking appears in the dial window on alignment of the corresponding telescope with eyepiece on rotating the knurled disk.

References Cited in the file of this patent

UNITED STATES PATENTS

| | | |
|---|---|---|
| 2,108,751 | Kuppenbender | Feb. 15, 1938 |
| 2,529,944 | Houck | Nov. 14, 1950 |
| 2,552,940 | Cornut | May 15, 1951 |

FOREIGN PATENTS

| | | |
|---|---|---|
| 838,391 | Germany | May 15, 1952 |
| 1,017,937 | France | Oct. 1, 1952 |